(12) United States Patent
Evans et al.

(10) Patent No.: US 8,918,645 B2
(45) Date of Patent: Dec. 23, 2014

(54) CONTENT SELECTION AND DELIVERY FOR RANDOM DEVICES

(75) Inventors: Ethan Z. Evans, Snoqualmie, WA (US); Luis Felipe Cabrera, Bellevue, WA (US); Hilliard Bruce Siegel, Seattle, WA (US); Peter N. DeSantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 338 days.

(21) Appl. No.: 12/889,918

(22) Filed: Sep. 24, 2010

(65) Prior Publication Data

US 2012/0079276 A1 Mar. 29, 2012

(51) Int. Cl.
| | |
|---|---|
| H04L 29/06 | (2006.01) |
| H04N 21/4402 | (2011.01) |
| H04N 21/2543 | (2011.01) |
| H04N 21/845 | (2011.01) |
| H04N 21/258 | (2011.01) |

(52) U.S. Cl.
CPC ..... *H04N 21/8455* (2013.01); *H04N 21/44029* (2013.01); *H04N 21/25435* (2013.01); *H04N 21/25875* (2013.01); *H04N 21/25825* (2013.01)
USPC ................................ 713/170; 726/28; 726/29

(58) Field of Classification Search
USPC .................. 713/170; 725/46, 115; 726/28, 29
See application file for complete search history.

(56) References Cited

U.S. PATENT DOCUMENTS

| | | | |
|---|---|---|---|
| 7,343,414 B2 | 3/2008 | Libscomb et al. | |
| 7,769,895 B1 | 8/2010 | Williams et al. | |
| 2002/0007418 A1 | 1/2002 | Hegde et al. | |
| 2005/0004976 A1 | 1/2005 | Mavrogeanes et al. | |
| 2006/0015580 A1 | 1/2006 | Gabriel et al. | |

(Continued)

FOREIGN PATENT DOCUMENTS

| | | |
|---|---|---|
| JP | 10-124430 | 5/1998 |
| JP | 11-122617 | 4/1999 |

(Continued)

OTHER PUBLICATIONS

International Search Report and Written Opinion mailed Feb. 9, 2012 in Application No. PCT/US2011/52640 filed Sep. 21, 2011, 11 pages.

(Continued)

*Primary Examiner* — Jeffrey Pwu
*Assistant Examiner* — Thong Truong
(74) *Attorney, Agent, or Firm* — Kilpatrick Townsend & Stockton LLP

(57) ABSTRACT

Intelligent content delivery enables content to be delivered to different devices in formats appropriate for those devices based on the capabilities of those devices. A user might access the same piece of content on two different devices, and can automatically receive a higher quality format on a device capable of playing that higher quality format. The user can purchase rights to content in any format, such that as new formats emerge or the user upgrades to devices with enhanced capabilities, the user can receive the improved formats automatically without having to repurchase the content. Further, the user can pause and resume content between devices even when those devices utilize different formats, and can access content on devices not otherwise associated with the user, receiving content in formats that are appropriate for those unknown devices even if the user has not previously accessed content in those formats.

24 Claims, 8 Drawing Sheets

(56) References Cited

U.S. PATENT DOCUMENTS

| | | |
|---|---|---|
| 2006/0161635 A1 | 7/2006 | Lamkin et al. |
| 2006/0256130 A1 | 11/2006 | Gonzalez |
| 2007/0204300 A1* | 8/2007 | Markley et al. .............. 725/46 |
| 2007/0226365 A1 | 9/2007 | Hildreth et al. |
| 2007/0233819 A1 | 10/2007 | Sato |
| 2007/0266416 A1* | 11/2007 | Cheng et al. ............... 725/115 |
| 2007/0268509 A1 | 11/2007 | Andreoli et al. |
| 2009/0070479 A1 | 3/2009 | Anderson et al. |
| 2009/0179754 A1 | 7/2009 | Burchard et al. |
| 2009/0259711 A1 | 10/2009 | Drieu et al. |
| 2009/0259764 A1 | 10/2009 | Karlsson et al. |
| 2009/0264103 A1 | 10/2009 | Chen et al. |
| 2009/0292799 A1 | 11/2009 | Eisener et al. |
| 2010/0042747 A1 | 2/2010 | Hascalovici et al. |
| 2010/0146146 A1 | 6/2010 | Welts et al. |
| 2010/0223407 A1 | 9/2010 | Dong et al. |
| 2010/0325086 A1 | 12/2010 | Skinner et al. |
| 2010/0325674 A1 | 12/2010 | Liu |
| 2011/0222549 A1 | 9/2011 | Connelly et al. |
| 2011/0235090 A1 | 9/2011 | Salgado |
| 2011/0252082 A1 | 10/2011 | Cobb et al. |
| 2011/0299110 A1 | 12/2011 | Jazayeri et al. |
| 2012/0078997 A1 | 3/2012 | Evans et al. |
| 2012/0079095 A1 | 3/2012 | Evans et al. |
| 2012/0166603 A1 | 6/2012 | Jain et al. |
| 2012/0197998 A1 | 8/2012 | Kessel et al. |
| 2013/0045681 A1 | 2/2013 | Dua |

FOREIGN PATENT DOCUMENTS

| | | |
|---|---|---|
| JP | 2001-078166 | 3/2001 |
| JP | 2002-290974 | 10/2002 |
| JP | 2004-247844 | 9/2004 |
| JP | 2005-130196 | 5/2005 |
| JP | 2005-175631 | 6/2005 |
| JP | 2005-328324 | 11/2005 |
| JP | 2006-074728 | 3/2006 |
| JP | 2007-527660 A | 9/2007 |
| WO | 2005/010763 A1 | 2/2005 |
| WO | 2008/096437 A1 | 8/2008 |
| WO | 2009/009106 A1 | 1/2009 |
| WO | 2009/158344 A2 | 12/2009 |
| WO | 2010/013103 A1 | 2/2010 |

OTHER PUBLICATIONS

Final Office Action mailed Mar. 21, 2013 in U.S. Appl. No. 12/889,962, filed Sep. 24, 2010.

2 Kindles—Same Account—Reading the same book, Internet article from MobileRead Forums, Aug. 2007; 6 pages.

Sharing Two Kindles, How does it work?, Internet article by Mike West, Mar. 22, 2008; 14 pages.

Norimoto Kimata, "Internet governance International trend and its background", Knowledge Creation and Integration, Jun. 2010 (vol. 18, No. 6), Nomura Research Institute, Ltd., May 20, 2010, pp. 52-75, ISSN: 0919-7133.

* cited by examiner

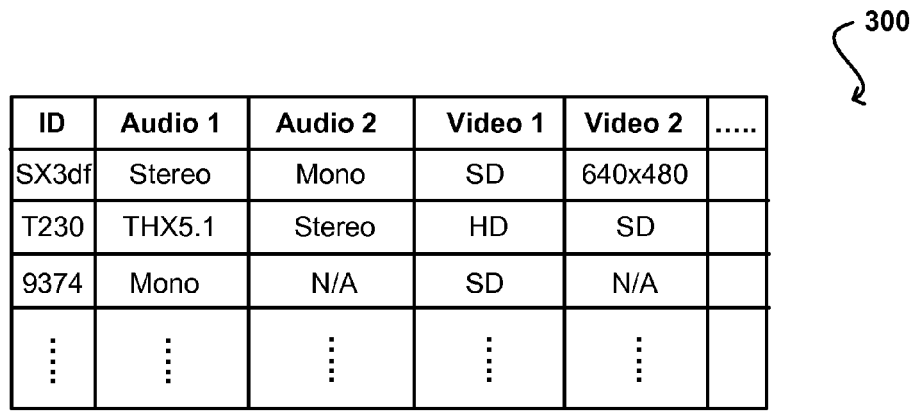
FIG. 3
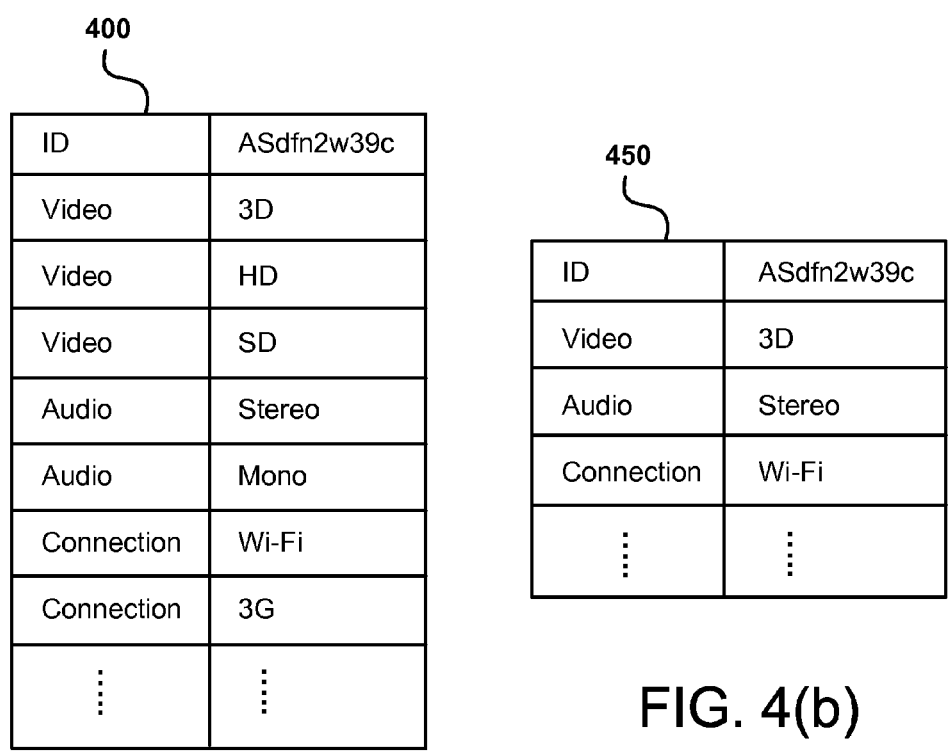
FIG. 4(a)
FIG. 4(b)

CONTENT SELECTION AND DELIVERY FOR RANDOM DEVICES

BACKGROUND

As an expanding number and variety of devices are connected to networks such as the Internet, an increasing amount of content is being accessed from across those networks. The content includes not only traditional electronic content such as data and documents, but also an increasing amount of media content, such as movies, music, books, games, and other such multimedia presentations. Because these types of content can require large electronic files, and because the amount of storage on many electronic devices is relatively limited, the content is increasing stored on a network-accessible appliance and the content is downloaded, streamed, or otherwise accessed by the various electronic devices.

An advantage to obtaining content across a network is that a customer can obtain copies of the content for a given device as needed, such as by downloading or streaming another copy or instance. In certain cases, a license for the content is tied to a particular device, such that if the user purchases a new device the user must purchase the content again to obtain a license for the new device. Even if the content license allows the user to access the content on a different device, however, the content will still be in the format that was accessible on the previous device. For example, if the user purchases a copy of a movie in a compressed format for viewing on a small portable device and the user subsequently upgrades to a larger device with improved display capabilities, the user will only be able to access the compressed version for the new device under the existing license. If the user wants a format with greater resolution, for example, the user typically must purchase a license to the new format. If a user has multiple devices with different capabilities, the user typically must purchase a separate license or instance for each desired format of a particular piece of content, such as a standard definition DVD for an automobile player, a high definition version for a home entertainment center, and a compressed or low resolution digital copy for a personal media player. If the user purchases another device through which the user wishes to access the content in a new or different format, such as a 3D format, the user must again purchase another license or instance of the content to obtain that format. The user also must know the capabilities of each device, and which formats are compatible with each device.

BRIEF DESCRIPTION OF THE DRAWINGS

Various embodiments in accordance with the present disclosure will be described with reference to the drawings, in which:

FIG. 3 illustrates an example data table including capabilities for different types of devices that can be used in accordance with various embodiments;

FIGS. 4(a) and 4(b) illustrate examples of capability information that can be received from various devices in accordance with various embodiments;

DETAILED DESCRIPTION

Figure 1:
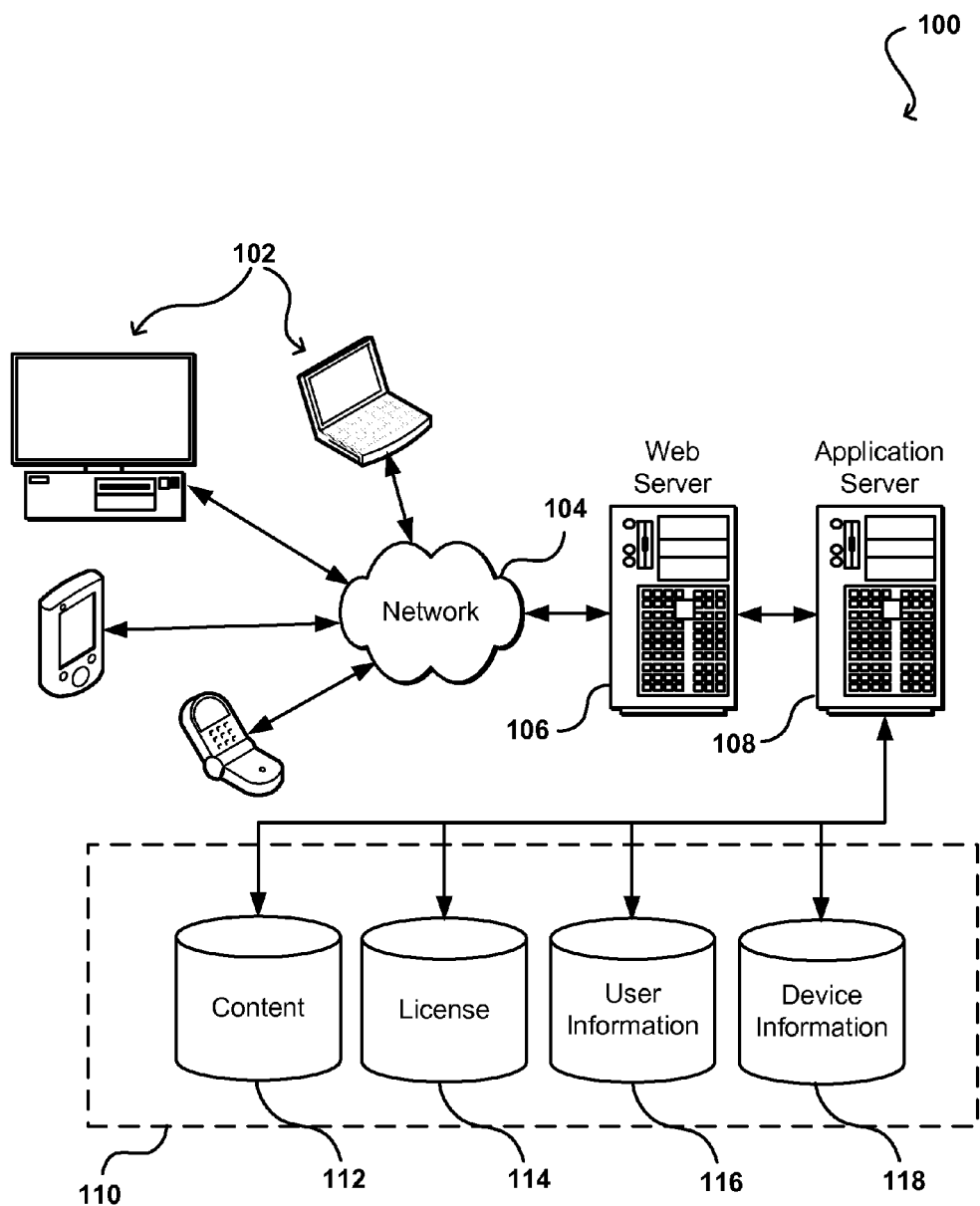
FIG. 1 illustrates an environment in which various embodiments can be implemented.

Systems and methods in accordance with various embodiments of the present disclosure overcome one or more of the above-referenced and other deficiencies in conventional approaches to providing access to content. In particular, various embodiments enable content to be delivered to, or otherwise accessed by, a device in a format that is dynamically determined to be appropriate for the device. A content provider or other such entity or source can determine various capabilities of a device, and can select a format that is appropriate and/or optimal for the device. A user accessing the same content on two different devices might then automatically receive that content in two different formats, where each format is appropriate for the respective device based at least in part on the relative capabilities of that device.

Approaches presented herein can be thought of as thinking about content in terms of rights to the content instead of specific files or formats. Instead of buying a piece of content in a particular format, for example, users can be able to purchase varying types of licenses or rights to content according to a version- or format-independent content availability business model, for example, which may include multiple existing and/or future formats, as well as other versions of a common format. Under such a license, a user purchasing a device with a new format does not need to repurchase the content in that new format, as the new format can already be included under the original license. Further, the delivery of the content in the new format can be determined automatically, such that the user can always obtain a format of the same piece of content that is optimal for the device being used to access that content. Once the user purchases such a license, the user can have rights to any evolution or variants of that content appropriate for a given device. In some embodiments, a user can automatically receive an updated version of the content whenever such a version becomes available, depending at least upon the rights of the user with respect to that content.

When a user attempts to access a piece of content on a device, that device can send a communication to an appropriate system or service to indicate the types of capabilities that the device offers. In other situations, the device can provider an identifier that can be used to determine the capabilities. A user agent or other appropriate module or other component of the system or service can analyze these capabilities, and determine the formats to which the user has rights, and can determine the highest quality (or other appropriate) format to delivery to the user via the current device. In many embodiments, the system or service does not need to know the type of device, the manufacturer, or any other such information, but instead only needs to know one or more capabilities of the device. In some cases, the device does not even have to be aware of which formats can be supported by the device, but instead reports information such as the audio capabilities, video capabilities, amount of memory, processing speed, video card capabilities, network connection speed, and/or other such information.

A user thus can obtain a variety of formats on any of a number of devices under a single license, without having to repurchase instances of that content. The content can even be delivered to devices that are not associated with the user, such as publicly available devices or devices of friends, relatives, or colleagues. The content can be accessed under the license in any format appropriate for these devices, even if the user has not previously accessed content in that format. The user also does not even need to be aware of the particular format or capabilities, and does not have to reconfigure or perform any actions to receive the optimal format on a specific device.

As mentioned, the content can be any appropriate type of content, such as audio, video, text, electronic book, video game, mobile applications, or other multimedia content. While the content might be provided from different sources, the rights determinations can be performed from a logically centralized location. Further, user behavior and history information can be tracked by a centralized service to help improve format selections and determinations.

Further, collecting information in a logically centralized location enables other functionality to be supported as well. For example, a user pausing playback or other access of content on a certain device can resume at the same location in the content on another device. The resumption can be performed even when the devices access the content in different formats. For example, a user pausing an audio book can resume at the appropriate point in text in an electronic book format. Time codes or other appropriate conversion techniques can be used in order to determine corresponding locations in different formats.

A "format" as used herein refers to a type of file or other instance of electronic content that complies with a particular standard, protocol, or other data structure that enables that instance of content to be played, executed, or otherwise accessed using devices having capability of supporting that type of file. Examples of different formats include standard definition DVD files vs. Bluray® files, Microsoft Xbox 360® vs. Nintendo Wii® files, and the like. A "version" as used herein refers to variations of content that might be intended for the same format or a different format. Examples of different versions include the original Star Wars® trilogy on DVD vs. the special edition Star Wars® trilogy on DVD, and the original version of Let It Be by the Beatles on compact disc or MP3 vs. the stripped down version of the Let It Be, etc. It should be understood that although format or version can be used in various examples, licensing and capability discussions can apply to both where applicable, as well as other variations that would be apparent to one of ordinary skill in the art in light of the teachings and suggestions contained herein.

Further, instances of content might not be limited to a single format or version in the traditional sense. For example, an instance of "content" could actually be comprised of multiple portions or elements of related content, each of which might have a different format or version, and may require different device capabilities. For example, an instance of content might relate to a movie as a primary element or portion of the content, but might also include other types of content as well, such as game content, electronic book content, audio or text content, etc. In some instances, these portions might be part of what is referred to herein as "static" content, where the instance of content comes bundled with specific versions or formats of each portion, and those portions do not change within the instance. In other instances, the content might be what is referred to herein as "dynamic" content, wherein portions of the content might change over time, or be dynamically selected based on interaction with the content. For example, static content might include a movie with the ability to view the screenplay along with the movie. Dynamic content might allow a user to submit and view comments on a social networking site relating to the movie, or navigate to different elements via one or more decision points.

Further, for instances of content with multiple portions there can be an independent determination of which format or version to provide for each portion. For example, in one embodiment where bundles are determined together, an instance of content that includes an audio book and electronic book content might analyze the capabilities of the intended device and select the optimal combination based upon those capabilities. In some cases, the bundles might then be limited in number and/or the possible combinations. In other embodiments, the determination might be separate, such that the optimal electronic book content can be determined and the optimal audio book content can be determined separately, whereby the user can receive the optimal version or format of each portion of the content.

In some embodiments where the user has the appropriate rights, the content can also upgrade the capabilities of the device and versions of various portions automatically. For example, the content might include an application or other executable script. The script might be able to determine versions of one or more applications or scripts on a computing device, such as a media player, rendering algorithm, or browser plug-in, and where possible can cause upgraded versions to be downloaded and installed on the computing device such that the device can have the necessary capabilities to support a new version or format.

In some embodiments, "intelligent" content can provide one or more decision points that can determine which portions or elements of the content the user is able to access. In some embodiments, the available decision points can depend at least in part upon the capabilities and/or rights of the user and the current device. For example, a movie might "contain" an optional dream sequence in 3D that can be accessed by a user at a certain point in the movie. If the user does not have a 3D capable device, or does not have rights to that portion, then the decision point might not be available for the user. In some embodiments, the user might obtain a different option or element, such as the ability to view a two-dimensional version of that portion, or potentially to have access to a different portion, such as a storyboard or commentary describing the contents of the 3D portion. Such an approach can encourage purchasing of content and repeated viewing on different devices, as the experience can differ based at least in part upon the capabilities of the various devices.

As mentioned, the selection of an appropriate format for a device can depend at least in part upon the capabilities of the device. Capabilities in general include things like audio and video capabilities, but can also include things like connection speed, processor or GPU capabilities, supported industry formats, types of input device (particularly for things like games), types of output device, etc. Various other factors can be used as well as should be apparent to one of ordinary skill in the art in light of the present disclosure.

For example, in some embodiments aspects such as the current rate of power consumption or amount of remaining battery life can be factored into the decisions about versions and/or formats to send to a device. For example, a video game might be able to be rendered on a device with a high resolution that is relatively resource intensive. If the user is using a portable device with limited battery life, for example, the user might configure the device to maintain power usage below a specified rate, or reduce consumption when the remaining battery life hits a certain level. Thus, if the portable device meets at least one of these criteria, the device can execute or receive a format or version of the game with a lower resolution. In some embodiments, the device might monitor power consumption or other such levels, and might contact a content delivery or management service when such a criterion is met, which can cause the version or format to change automatically to the version or format that consumes resources at a lower rate. As discussed elsewhere herein, switching between versions or formats can be done virtually seamlessly, with the user able to resume in substantially the same state in the other format. In some embodiments, when the user performs an action such as to plug in the device, the device can go back to rendering the higher resolution version or format, etc.

FIG. 1 illustrates an example of an environment 100 for providing delivery of various types of content to various types of devices across an electronic network that can be used in accordance with various embodiments. Although the example environment is presented as an Internet-based environment for purposes of explanation, it should be understood that different network environments may be used, as appropriate, to implement various embodiments. The example environment includes can include a number of electronic client devices 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. Each device can correspond to one or more users, and each user can have one or more devices. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 106 for receiving requests from user devices and serving content in response thereto, although for other networks an alternative device serving a similar purpose could be used, as would be apparent to one of ordinary skill in the art in light of the present disclosure.

The illustrative environment includes at least one application server 108 (or content server) and at least one data store 110. It should be understood that there can be several application servers, layers, processes, components, or other such elements, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server 106. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing content 112 (e.g., audio, video, game, and electronic book content), licensing information 114, user information 116, and device information 118, which can be used to serve content using one or more of the approaches discussed herein. It should be understood that there can be many other types of information stored in such a data store, such as page image information and access rights information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of content. In this case, the data store might access the user information to verify the identity of the user and access the content information to obtain information about instances of that type of content. The information and/or content can then be returned to the user, such as in a results listing on a Web page that the user is able to view via a browser or other application on the user device 102. Information for a particular instance of content can be viewed in a dedicated page or window of the browser, in a media player, as part of an application, or via any other appropriate interface.

Each server typically will include an operating system that provides executable program instructions for the general administration and operation of that server and typically will include non-transitory computer-readable media storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature and not limiting to the scope of the disclosure.

An environment such as that illustrated in FIG. 1 is often referred to as a "cloud computing" environment, as various operations can occur on behalf of the user on one or more devices that may be distributed across various appliances, locations, and/or geographical regions, referred to as being performed "in the cloud." By storing information and content in such a distributed environment, and offloading at least some computations or operations to remote systems or services, user devices can offer more functionality than would otherwise be possible, or at least practical, using a device alone. For example, a user of a user device 102 might want to stream a video file. One approach to obtaining such a file is to purchase rights (e.g., a license) to a piece of content, and send a request across a network 104 to an appropriate address (e.g., a URL of a Web server 106 of a content provider). The Web server can forward the request to an appropriate system or service, such as an application server 108, which includes executable instructions for analyzing the request (and any related requests) to determine information such as the source of the request, the intended content, and identifying information for the user. The application server is able to validate the user identity against information in a user data store 116, for example, and determine whether the user has rights to the content using information in a license data store 114, or similar location. If the user has rights to the content, the application server can cause information for the content to be pulled from a content data store 112 or other such location, and sent to the destination specified by the request. It should be understood that there can be many additional or alternative systems or services for performing any of these or other such tasks as discussed and suggested herein. Further, the information returned to the destination can include any appropriate information, such as a copy of the content or an address from which to download or otherwise obtain the content.

As discussed, a conventional license that the customer purchases (or otherwise obtains) often entitles the user to one copy of the content, or at most one copy of the content at any given time. In some cases, a user might get a multi-user license or multi-device license. For each of these cases, however, the user typically only gets access to the content in one format per the license. For example, if the user buys a copy of a puzzle game in a format for a specific video console, the user does not also obtain rights to a copy of that puzzle game in a different format for use with different portable video gaming device. Even in cases where users are able to obtain multiple formats, such as by obtaining rights to a DVD and a digital copy of the content, the user must manually select the appropriate content for each device included in the license, such as by placing the DVD in the device or downloading the digital copy from a specific address. If the user buys a device with a different format or capability, the user must buy another copy of the content in order to take advantage of that format or capability. The need for multiple purchases of each instance of content can get expensive, and can result in multiple versions that must be managed by the user. Further, people often do not appreciate having to repurchase content such as music by a favorite artist each time a new format is developed. Customers thus can either be reluctant to buy into new formats, which can be bad for manufacturers and content providers, or can even illegally obtain the content in the new format, which is even worse.

Approaches in accordance with various embodiments descried and suggested herein enable users to change the way in which content is purchased or otherwise consumed. Further, various embodiments provide for intelligent content delivery such that users do not need to manage various formats or versions, or make sure that the optimal format is being accessed on a given device. Various embodiments enable users to obtain new or updated versions of certain content, or additional portions of existing content, as those versions become available and/or as users obtain or access devices that are capable or presenting new versions or formats. Various other capabilities and functions are provided as well as discussed with respect to the various embodiments.

Figure 2:
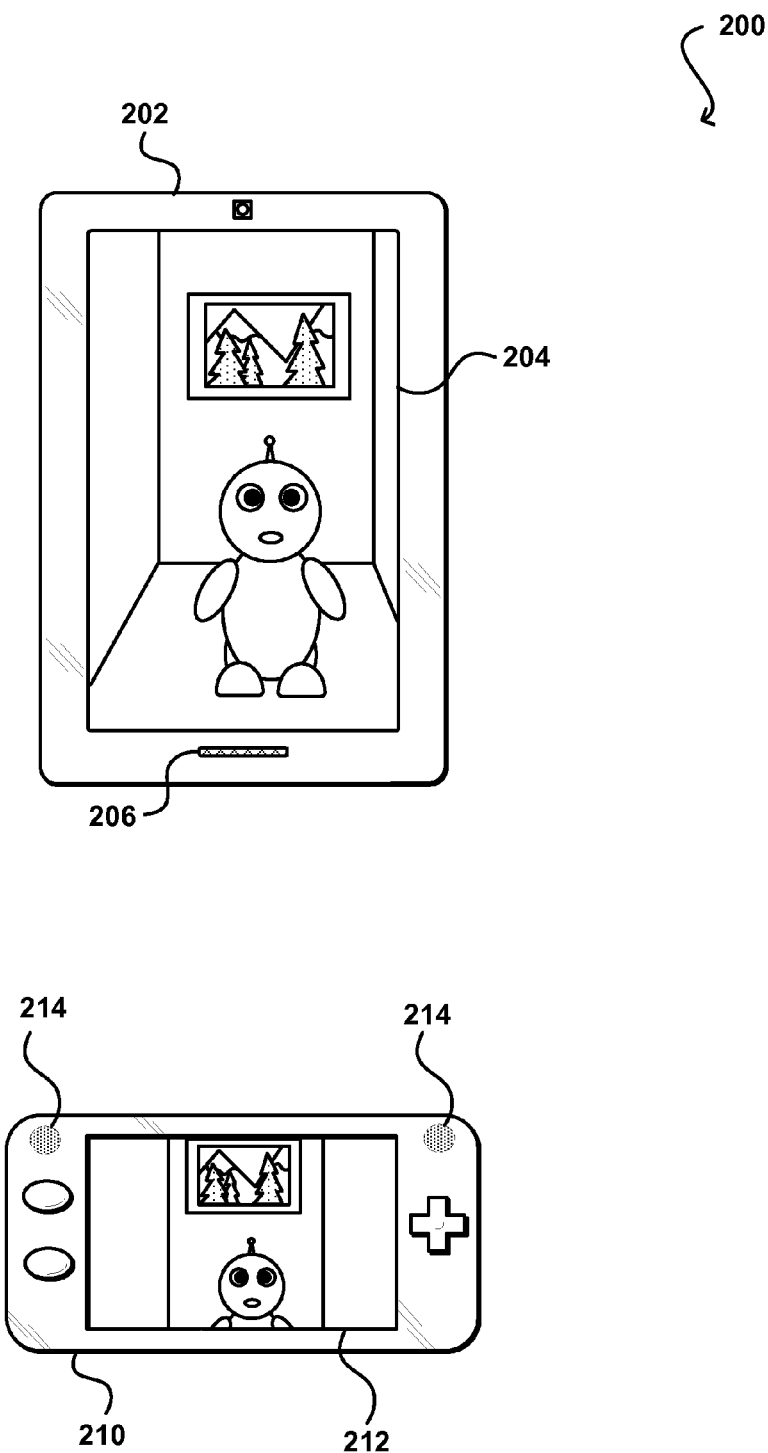
FIG. 2 illustrates different formats of the same content displayed on devices with different capabilities in accordance with various embodiments.

As an example, consider the situation 200 of FIG. 2 wherein a user has two devices, a tablet computer 202 and a portable gaming device 210. Each of these devices is capable of displaying video content and playing the corresponding audio. As can be seen in FIG. 2, however, the capabilities of these devices are significantly different. For example, the tablet computer has a much larger display element 204, which in this example is in a portrait orientation (although some devices also can be capable of also displaying in landscape orientation as known in the art, but for the sake of explanation this capability will be ignored in this example). The portable gaming device, on the other hand, has a much smaller display element 212 that is in a landscape orientation. Various other display capabilities of these display elements can differ as well, such as the resolution and ability to display images or video of varying color depth, black and white or grayscale images, images with a particular sharpness or clarity, etc. Accordingly, a format of content such as a video file can be optimized to play with the appropriate characteristics on either device. Similarly, the tablet computer 202 in this example includes a single speaker 206 for playing audio in mono, while the portable gaming device 210 has two speakers 214 capable of playing audio in stereo (or mono). As is common, a different version or format of the movie in this example might exist for each device.

If the user only purchases the movie in one format optimized for one of the devices, the experience of the content can be less than optimal using the other device. For example, if the user purchases a copy in the format for the gaming device 210 but plays the movie on the tablet 202, the resolution of the movie may be much lower than is capable of being displayed on the tablet, and the difference in aspect ratios will require either a portion of the movie to be cut off (e.g., modified to fit the screen), the aspect ratio of the movie adjusted (which can cause people in the movie to either be too elongated or condensed, etc.), or the display area of the movie can be shrunk (e.g., with bars on the side) such that only a portion of the screen can be used to display the movie. Further, since the version of the movie that was purchased has audio in stereo, the mono capability of the tablet computer 202 may only be able to play one of the audio channels (e.g., half the stereo audio), or might not be able to reproduce the sound at all depending upon the encoding or other such aspects. Similar problems can arise if the user instead purchased the content for the tablet computer but attempted to play the content on the gaming device.

Approaches in accordance with various embodiments enable a user to access content on any of a number of different devices, and obtain that content in a format or version that substantially matches the capabilities of each device (or at least as much as possible). The user does not have to know the capabilities of each device, or the format(s) available for each device, but can automatically have access to a version and/or format that takes advantage of the capabilities of the current device. The user can submit a request from any of these devices without having to utilize a special address, input or select specific information, or perform any other such operation, and an application executing in the cloud or at another remote location can determine the format to be accessed via the device.

In the example of FIG. 2, a user might be able to access a movie about a robot in a "My Library" or similar section of an interface, Web page, etc., from the tablet computer 202. The user could select an icon or link for the movie, which can generate a request to be sent to a content provider. The content provider can obtain information about the device from which the request was sent, and can determine the appropriate format of the movie to provide to the user via the tablet computer. If the user had instead performed the same operation from the gaming device 210, the content provider would obtain information about the gaming device and determine an appropriate format to provide to the user via the gaming device, which could be the same or different from the format provided for the tablet computer, based upon information such as the relative capabilities of each device, the available formats, and the type of license obtained by the user. Since the gaming apparatus can provide stereo sound, the content provider might enable the user to access a version of the movie that has a soundtrack in stereo sound, while the tablet computer might get a version with mono sound. Various other formats can be provided as well, as appropriate.

In one embodiment, information for various devices is maintained in a single location. For example, a content provider could keep a list of device information, or could subscribe to a service that provides capabilities for various devices. FIG. 3 illustrates an example table 300 that can be maintained for such purposes. In the example table, a first column 302 contains unique identifiers for each type of device for which information has been obtained. These identifiers can be any appropriate unique identifiers, such as product serial numbers or other such identifiers. In some embodiments, unique keys will be generated which then require a mapping to specific devices or categories of devices having similar capabilities. Various other options can be used as well. The example table also includes several columns 304 listing various capabilities of each type of device. For example, the information for the first device (with ID SX3df) indicates that type of device can handle stereo or mono sound, as well as video in standard definition (SD) television format, or at (or up to) 640×480 resolution. The other devices include information for these and/or other such capabilities as well. When a request is received to provide content for a device, the system or service can access this table to determine the capabilities of that type of device. Using the capability information, a format selector or other such component or module can utilize one or more selection algorithms, criteria, or other such approaches to determine one or more formats that can be presented on that type of device.

In some embodiments, the format selector will select the format with the most advanced capabilities that is compatible with the device. For example, the format selector can select the format with the highest resolution, enhanced capabilities such as 3D video, motion control, etc. In some cases, the selector can utilize an algorithm that can rank the formats, and select the highest ranking format (or another format per at least one selection criterion) to present to the user via the device. In some cases, there might be various formats available that have different levels of capability combinations. For example, a first format might have a higher video resolution but a lower audio capability. Various ranking factors can be utilized to determine the overall ranking score of each format in such an instance. For example, the video resolution might be weighted heavier than the audio quality. In some cases, the user might prefer certain capabilities over others, such as HD over 3D, even though 3D might otherwise be weighted more heavily. In some cases, users can set rankings, specify formats to be preferred or not considered, etc. In some embodiments, the content provider can examine other information such as user history or behavior information to attempt to determine a format that is not only appropriate for the device, but also optimal for that particular user.

In at least some embodiments, however, it can be undesirable or at least impractical to attempt to maintain a list of all potential devices and capabilities, which must be updated each time a new device is available, an upgraded capability is available, etc. Further, certain software or software upgrades might be made to specific devices such that devices of the same type might have different capabilities. Accordingly, approaches in accordance with various embodiments instead obtain the capability information from the device itself.

For example, a content provider might receive a request for content from a specific device. If not already included in the initial request, the content provider might send a response back to the device to ask for the capabilities of the device. In some embodiments, this response is sent only if there are multiple formats of the requested content available, or if the content is of a type of format that might not be able to be accessed properly (or at all) on certain devices. The response can be for a list of all relevant capabilities, as may conform to a specific standard, or for values of specific capabilities. The device then can send the information to the content provider in a form similar to that illustrated in the example table 400 of FIG. 4(*a*). In this example, the device sends a list of all potential formats and/or capabilities that are supported by the device. As can be seen, there can be a separate listing for each type of video supported, each type of audio, which connections are available, etc. Using this information, a content selector can determine all potential combinations of capabilities for the device and use these combinations to select the optimal content version to be accessible on that device. The capabilities in some embodiments are ranked by the relative desire of each capability. It should be understood that a table is just an example, and that the information can be conveyed in any appropriate manner.

FIG. 4(*b*) illustrates another example of a capability table 450 that can be sent by a device in accordance with various embodiments. In this example, the device does not include each of the capabilities of the device, but lists specific capabilities, such as a video capability, audio capability, etc. In some embodiments, these can be specific capabilities which the user requests or requires. In other embodiments, these values can be preferences or can specify the maximum value for each capability. For example, if a device can support any common video resolution up to HD video, the device might return a single value of HD, and the content provider can select any format including or up to HD-quality video.

In some embodiments, the fact that there are multiple formats available, one or more of which might be optimal for a particular device, does not necessarily determine which format or version the device or user receives. For example, the license obtained by the user for that piece of content might not include access to certain formats. A user might have only purchased or otherwise obtained a license for a single format (e.g., downloaded a specific version without rights to other versions), such that the other formats are not accessible on other devices even if the format for the purchased license cannot be accessed on that device. Even if the license entitled the user to other versions or formats at the time of obtaining the license, the license might not apply to future versions or specific formats, etc.

Figures 5, 6:
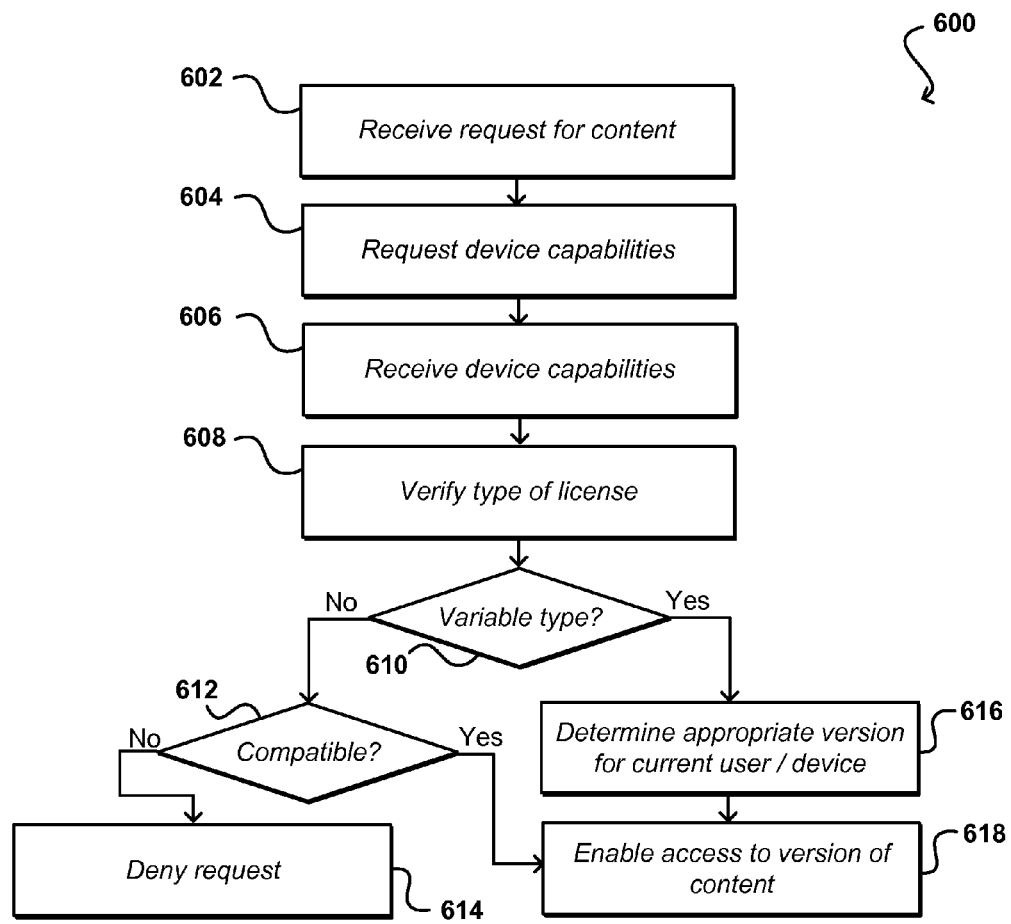
FIG. 5 illustrates an example table including various licensing options for a group of content that can be used in accordance with various embodiments.
FIG. 6 illustrates an example process for delivering content to a user in a format appropriate for a specific device that can be used in accordance with various embodiments.

Embodiments discussed herein can consider the rights to specific content for a user, as opposed to specific instances of that content as in previous approaches. For example, instead of registering that a user has purchased a specific version of an electronic book in a particular format, a license determination module or other such component or service can instead register, update, and otherwise maintain the rights that the user has to instances of that content. For example, the table 500 of FIG. 5 illustrates variations of rights to a piece of content that can be obtained by a user. In this example, the user can purchase a license that enable that user to access the content on a specific number of devices. For example, the user might purchase a single-device license whereby the user is only able to access that content on a specified device. Depending upon the terms of the license, the user might be able to migrate that license to a different device, specifying at most one device at a time, or the license might be tied to a specific physical device. A user might also be able to purchase a multi-device license, whereby in this example the user can access the content from up to four devices at a time. The cost can be greater for a multi-device license than a single device license. A user in some embodiments might also be able to purchase a license whereby the user can access the content from any device, with the license still applying to personal use by that user (or up to a specified number of users). In an unlimited personal device license, the user might have to be identified to the content provider in such a way that the content provider can monitor whether the user is enabling other users to utilize the unlimited personal license, in order to prevent content theft. The cost for unlimited personal use also can increase accordingly.

While there are various types of multi-user or multi-device licenses known in the art, approaches in accordance with various embodiments also enable users to purchase varying levels of format and/or version licenses, which can include versions or formats that are not yet developed or available, and that can be provided to a user automatically when available without the user necessarily knowing the type of format or version. And, as discussed elsewhere herein, these formats and/or versions can be selected dynamically and/or intelligently by a system or service based at least in part upon the capabilities of the device which the user is using to access the content.

For example, in FIG. 5 there is a licensing option that enables a user to purchase a single version and/or format license, which enables the user to access only the original format and/or version that the user obtained via purchase, download, etc. Depending upon the type of device license, the user might be able to access this format and version on multiple devices, but those devices still will only be able to access that particular version and/or format, independent of the capabilities of those devices. For example, if the user purchases a version of a movie in standard definition and decides to play that movie on a device capable of playing high definition content, the device still will only be able to play the standard definition version allowed under the license.

The user also can be able to obtain, in at least some embodiments, a license to all current versions and/or formats. For example, a user purchasing an online video game might be able to purchase a license to play that game in any existing format, such that the user can access that game from a personal computer, Xbox 360®, Playstation 3®, or Wii®, which might include all the formats in which that game can be accessed at the current time. The cost for such a license might not be any greater than for a single format license, as the essential content might not be different, but the interface through which the user accesses the content might be in sufficiently different formats. In another example, the user might be able to obtain a license to DVD, Blu-ray®, and digital copy versions of a movie. The cost for obtaining the license to all three can be greater than the cost to obtain a license to just one of these formats, but less than the cost of obtaining licenses to two or three of the formats individually. Such an approach can be attractive to a user because the user can obtain additional formats of the movie for a relatively small additional cost, and can be attractive to the provider of the movie as such a pricing structure encourages the users to purchase a more expensive license with the original purchase.

Also as seen in FIG. 5, a user in at least some embodiments can obtain a license to any version or format, including any future version or format of the content. For example, the user might today be able to access content in any existing format for that content, such as 3D, HD, and SD for a video file. By purchasing or otherwise obtaining a license to any format, the user also can access that content in new formats as those formats become available. For example, technology might develop that enables the video file to be displayed as a fully three-dimensional hologram. If the user at some point in time purchases such a holographic player, the user will not have to repurchase that content in the new format. Such a license can be attractive to a user as a user can purchase a piece of content once and not have to worry about repurchasing that content again at a later time in a new format, etc. Such a license also can be attractive to a content provider because, although the provider will lose revenue from users repurchasing their catalog of content in new formats, the provider will obtain money for formats that do not yet exist, which can improve short term revenue while providing funds to develop those future formats up front (instead of trying to recoup those development funds afterwards, which can be risky due to events such as competing format wars where one of the formats often fails and results in losses to supporters or adopters of that format).

Also as can be seen in FIG. 5, the user can have the option of purchasing the unlimited format and/or version license for one, multiple, or any number of devices. Although the prices can go up accordingly, an unlimited personal use license in any format can ensure that a user only has to purchase a license to a piece of content once, as the user can access that content in any format from any supported device without having to repurchase the content, purchase a new license, etc. It should be understood, however, that users might purchase less than full use licenses in order to reduce costs, particularly if the user is not sure how much the user will enjoy the content, but that the user might want additional formats, versions, or device access at one or more subsequent times. Approaches in accordance with various embodiments can enable users to upgrade their licenses for less than the cost of a new license. For example, in FIG. 5 a user can purchase a single format and version of a piece of content for access on a single device. If the user enjoys the content, the user might want to upgrade to own any version of that content, and be able to access that content from any device. The single device and format license is $9.99 in that example, with the limited license being $39.99. In some embodiments, the user might be only charged the extra $30.00 to upgrade the license, while in other embodiments the user might be charged some intermediate additional price, such as $32.99, which is less than the cost of the unlimited license, but includes an extra fee to cover the cost of the additional transaction. Various other approaches and pricing structures can be used as well within the scope of the various embodiments as should be apparent in light of the present disclosure. In some cases a user might be able to receive discounts for licenses, such as by enabling content providers to share information (not including user identifying information) about viewing preferences, how often users access certain content, how often users finish certain content or how far the average user gets, etc.

Once a user obtains a license to a piece of content, information for that license can be stored to an appropriate (logically) centralized location, such as the license data store 114 illustrated in FIG. 1 to be accessible over a network. In some embodiments, a content provider or other such entity can subscribe to a licensing or rights service, which can manage the information for various content providers, users, and other entities. An advantage of a rights service is that different formats and/or versions might be provided by competing content providers, who might not want to share information with each other but may need to know the type of license the user has already purchased for the piece of content. In some embodiments, the licensing service can handle the royalties associated with the content, and might manage (or at least provide information needed to manage) the funds associated with the various licenses, such that various content providers can receive compensation when the user accesses their format or version using a license that was purchased through another provider. Various other revenue sharing approaches can be used as well.

Various other types of licenses can be purchased as well using such a service. For example, a user might purchase a license to any movie produced by a certain studio in any format, such as through a subscription, and the service could handle passing rights information to the various providers, as well as ensuring that those providers receive proper compensation. Such a license can be relatively expensive, but can be attractive to a user as the user can access any movie from any device at any time in the newest or best format available for that device. Such devices may not be prohibitively expensive, however, as existing services utilize a pricing model based on the fact that a user with a personal use license can only access one instance (or a limited number of instances) of content at any given time, such that the amount of content a user can access per billing cycle (e.g., hour, day, month, or year) is limited. Similar pricing theories could be applied here, but expanded to include the wide variety of licenses described and suggested herein.

FIG. 6 illustrates an example of a process 600 for using capability and license information as discussed above to dynamically determine the appropriate format to provide to a user in response to a request for access or a similar event or occurrence. In this example, a request is received for a piece of content 602, such as where a user selects an icon or link on a device which causes a request to be sent over a network to a content provider. Unless capability information is included in the initial request or otherwise available to the content provider, the provider can send a response to the requesting device asking for the capabilities of that device 604. This can include a request for all device capabilities, a specific capability, or anything in between. A message or other communication including at least some of the requested device capabilities then can be received from the device 606. The content provider can verify the type of rights that the requesting user has with respect to that content 608. While in this example the license verification is performed after obtaining the device capabilities, it should be understood that these (and other) steps can be performed in other orders, concurrently, or in parallel within the scope of the various embodiments unless otherwise stated. The initial verification can include whether that user has access to that content on that device. Assuming the user has rights to that content, the content provider can determine whether the user has a variable type of license 608, which allows the content provider to determine a format, version, or other aspect of an instance of content for the user on that device. If the user does not have a variable type of license, the content provider can determine whether the licensed version is compatible with the requesting device 612. If not, the request can be denied 614 and/or the user can be notified that the content cannot be accessed on that device. If the licensed format and/or version is compatible with the capabilities of the requesting device, the content provider can enable the user to access that version and format on the requesting device 618. While the term "content provider" is used for purposes of explanation, it should be understood that the party determining the appropriate format or version might be the same as, or separate from, the party storing license information, storing the content, enabling access to the content, and/or performing any other aspect of the process. The term "provider" can be interpreted broadly in at least some embodiments to include any party or entity that can be involved in the processes discussed and suggested herein for enabling a user to obtain access to specific content.

If the user has a variable or flexible type of license that is not specific to a single format, version, or other such aspect, the content provider can determine the appropriate format and/or version based at least in part upon the device capabilities and rights information 616. As discussed elsewhere herein, this can include determining compatible versions or formats, and ranking or otherwise selecting at least one version or format based on specific ranking or selection criteria, as well as using any other appropriate information such as user preference or behavior information. In some embodiments, the content provider also can provider the user with an option of a version or format to receive out of all compatible formats and versions, etc. Once an appropriate format and version are determined, the user can be enabled to access that instance of content from the device 618.

In some instances, a device might not respond with information about its capabilities. A device might not respond for any of a number of reasons, such as the device being an older device without such communication capabilities, or working with a different format or protocol, etc. Various approaches can be utilized in accordance with various embodiments to attempt to determine which format to enable the user to access via the device. In some embodiments, a format with the least or lowest capability requirements can be provided, as the device will be most likely to be able to support that format. For example, if the request is received from an Internet-enabled television but the television does not provide information about its possible resolution modes, the format of the content provided can be standard definition, as the television most likely will be able to support that format. In some embodiments, the user can also be presented with an option to select a different format. If the system has determined the various formats to which the user has rights for the content, the user can be presented with a list of at least some of those formats, and allowed to choose which format to access.

In another approach, the system might look to user behavior or preference information to attempt to determine the most likely format to enable the user to access. If, using the television example above, the user prefers and almost always watches high definition video formats, a determination can be made that the user is likely attempting to access high definition content. The format delivered to, or accessible by, the user then can be high definition content. The user again can be presented with a set of options of other formats or versions of content to which the user would like access. The set of options might appear automatically if the format is determined to not be compatible on the device, and might be accessible to the user at any time via a menu item or other such option.

In some embodiments, the system can provide a similar menu that enables a user to select the desired version when a content provider system detects different versions for the identified format. For example, the content provider might determine that the user should have access to a high definition version of the content based upon device capabilities, rights, etc. If the content provider also determines multiple versions, such as an original black and white version of an old movie, along with a colorized version and a version with directory commentary, the user can be presented with options as to which version to access. Such an approach can be desirable for a user, as the user can learn of other versions of content to which that user might already have access rights. Further, if there are related versions such as remakes, parodies, or other such variations based at least in part upon that content that can be accessed by that device, those can be presented as options as well. If the user does not already have rights, the user can have the ability to obtain rights that include any related item of interest. And that license can at least include rights to an optimal format for the current device, as determined by the content provider system or other such system or service based at least in part upon the capabilities, preferences, and/or other such factors as discussed elsewhere herein.

When a user obtains rights to access content of various formats on multiple devices, the user can obtain various additional functionality. For example, since data can be stored in a logically centralized location, such as in the cloud or across a network, a content provider or similar party can handle information such as current locations, points, or other portions of the content to which the user has navigated or otherwise accessed. For example, when a user reaches a certain level in a game, a particular chapter in a book or movie, a track of an album of music, or another such trigger or threshold, information can be sent to the provider indicating such state. In some embodiments, each time the user navigates away from an instance of content, such as by shutting off a device, pausing an instance of content, or moving to another instance of content or application, the device can send state information (e.g., the halt state at which the user stopped accessing the content from a given device) to the provider such that the provider can store that state. In other embodiments, the provider can automatically determine a halt state for the content as the content provider will stop receiving requests for more content where the user left off, indicating that the user has halted accessing the content on the current device. When the user wants to resume that content on the device, the content can be accessed from that point using the state, location, or other such information stored in the cloud by the provider. Further, halt state information can include other aspects as well, such as the volume or brightness level, or any other such value that can be ported over to the other device.

Such an approach can be particularly desirable for streaming content, where such state information often is not stored remotely. In various embodiments, content can be delivered entirely to a device, portions can be streamed and other portions or elements delivered or installed entirely, or the entire content can be streamed. Determinations of halt state thus can depend at least in part upon the type of content delivery. If the entire instance is stored on the user device, the user device might be configured to send halt state information to a central system or service, such that the user can resume on a different device. If the content is streamed, the system or service might be able to determine the halt state automatically, without having to receive state information from the user device. For content with only certain portions or elements stored on the device, a combination of the above approaches might be utilized.

Figure 7:
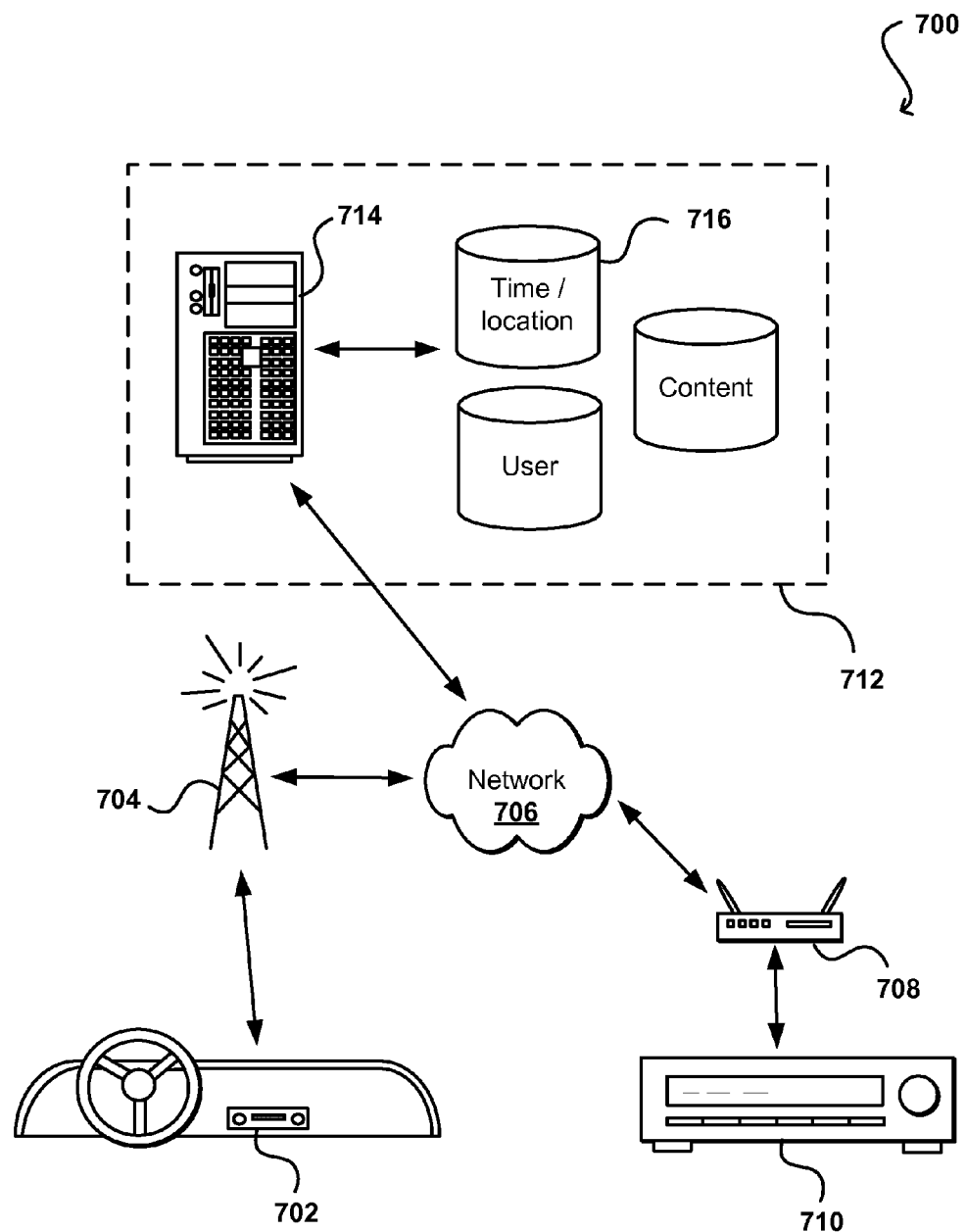
FIG. 7 illustrates an example configuration wherein content can be paused on one device and resumed on another device using formats that are appropriate for each device, in accordance with various embodiments.

An advantage to storing this state information in a cloud or other such location is that the user can resume at the desired point in the content using another device as well. For example, consider the situation 700 of FIG. 7. In this example, a user has obtained rights that enable the user to access a piece of music on both the user's car stereo 702 and the user's home receiver 710. The car stereo is connected to the content provider 712 using any appropriate mechanism, such as a cellular or 3G connection to a cellular provider system 704, which can then connect through a network 706 such as the Internet to an appropriate server 714 (e.g., a Web server or other such device) of the content provider. As should be apparent to one of ordinary skill in the art, FIG. 7 illustrates only basic components for purposes of simplicity of explanation and a number of other components of the cellular network, content provider system, and other components are not shown but could be used to provide such functionality as known in the respective arts. If the user turns off the car radio 702, changes the channel on the radio, or otherwise quits listening to that piece of music at a certain point in the music playback, information about that point can be transmitted to the content provider system 712, which can cause that information to be stored in a time/location data table 716 or similar location. When the user subsequently turns on the home receiver 710, the receiver can send a request to the content provider 712, across the network 706 using any appropriate components such as a wireless modem 708 or other such device. If the receiver already stores a local copy of that content, the content provider can send the location information to the receiver such that the receiver can start playback where the user left off in the car. If the receiver will instead stream (or otherwise download or obtain) the content, the content stream can start where the user left off in the car. Such an approach effectively enables a user to pause content on one device and resume on another device, without those devices having to know about each other, communicate with each other, etc. In some embodiments, however, each device for a user can communicate with the other user devices to determine whether the user paused certain content, where to begin playback, etc., instead of storing some or all of this information in the cloud.

Another benefit and significant advantage over conventional systems revolves around the fact that the user can also automatically resume that content on another device in a different format. Returning to the example of FIG. 7, the user might receive a format of the version on the car stereo 702 that is in a conventional two-channel stereo format. The user's receiver 710, however, might be capable of playing a higher quality format of the content, such as a format in 6:1 surround sound. In at least some embodiments, the receiver when sending the request can also send capability information (as part of the same or a separate request as discussed above) which can be analyzed by the content provider system. The content provider can determine the appropriate format for the receiver, and can determine the location in that format where the user should resume playback. When the user accesses that content on the receiver, the receiver can resume playback of that content in a format that is optimal for the receiver.

In some embodiments, the content provider will store information such as time code conversion information for the content formats. The determination as to where to resume access in a different format might not be straightforward. In some cases, the system may require access to information that indicates how to translate a time code or position in one format to a time code or position in another format. For example, the user might be listening to playback of an audio book on the car stereo. If the user attempts to resume access to the book on an electronic book reader at the point where the user left off in the car, but the book reader does not provide audio playback or the user prefers to read on the book reader, the content provider will need to determine, based on the time code of the audio playback, where in the text of the book format to resume on the book reader. Similarly, if the user is reads a book up to a certain point and then wants to instead finish the story by watching the movie version, the content provider can require some conversion information to be able to correlate the current position of the user in the book with a corresponding location in the movie. In some cases a user might buy a license to various versions of a piece of content which can include the movie version, electronic comic version, book version, video game adaptation, novelized version, screenplay, storyboards, director commentary, etc. At any time, a user might want to switch to another version or format, such as to read the original screenplay for a scene after viewing a chapter of a movie, etc. In such an embodiment, the system must have a way to correlate various positions within each of those formats. In some embodiments the system might store specific time codes that correspond to certain locations across each of the formats and versions. In other embodiments, the system can store a curve or function that maps a timeline to locations in each piece of content, and then can more accurately compare relative positions in two versions of the content. Various other comparison approaches can be used as well within the scope of the various embodiments.

Figure 8:
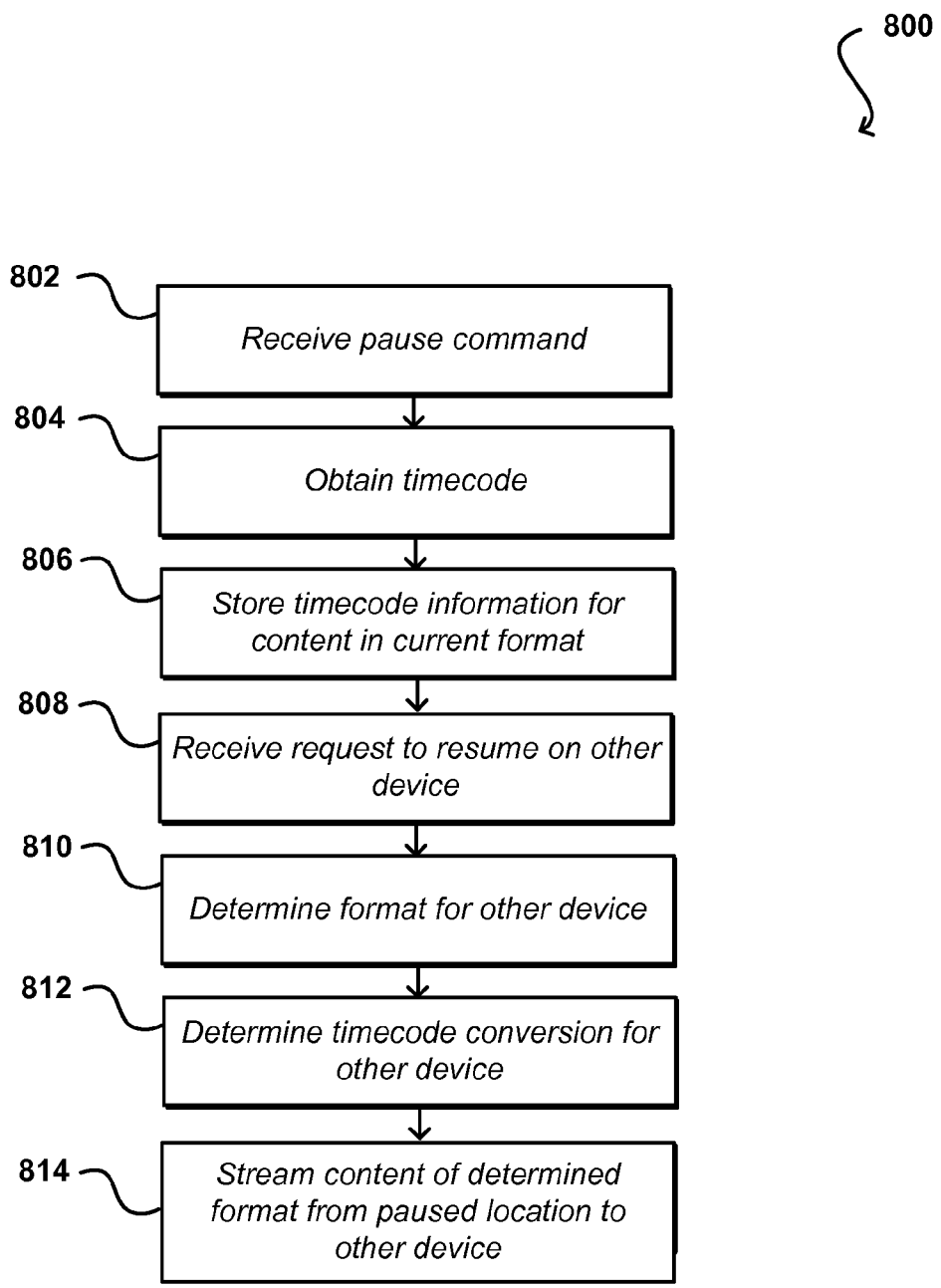
FIG. 8 illustrates an example process for resuming content on a separate device using a device-appropriate format that can be used in accordance with various embodiments.

FIG. 8 illustrates an example process for resuming content 800 on another device that can be used in accordance with various embodiments. In this example, a pause (or similar) command or request is received from a device 802. As discussed, this can include any appropriate notification or communication indicating a point or location where a user left off, paused, terminated, or otherwise exited the content on the device. The notification can be generated in response to any appropriate event, such as a user selecting a pause option, navigating to other content, turning off the device, etc. Either as part of the notification or as part of a subsequent communication, the time code (or another appropriate identifier) for the location where the user left off can be obtained 804. The time code information for the current format can then be stored in an appropriate location for later retrieval 806. In some embodiments, this information will only be stored: for a specified period of time, upon user request, until the user accesses different content on the device, or for any of a number of other reasons as may be selected or configurable by the user, content provider, or other appropriate entity or party. Subsequently, a request can be received to resume the content on another device 808. This request can be generated in response to the user again accessing that particular content on the other device, or may be generated automatically when the user powers on that other device. For example, Internet radio stations might always pick up where the user left off on the same device or another device for the same user or license. The capabilities of the other device can be determined using any approach discussed elsewhere herein, and an appropriate format can be determined for the other device 810. An appropriate time code conversion (or similar process) can be performed to determine the point in the new format at which to resume playback or other access 812. Once determined, the other device can begin to stream (or otherwise playback or provide access to) the content at substantially the point where the user left off on the original device 814, but in a format optimal for the current device. It should be understood that in some cases the format determination for the current device might result in the same format that was used for the original device, but the determination is still made dynamically when there is more than one format available in at least certain embodiments.

Other advantageous functionality that can be obtained through various approaches discussed herein is that a user can obtain, access, and/or resume content on devices that are previously or otherwise not associated with that user, and that might include formats that were not previously associated with, or accessed by, the user. For example, a user might go to a friend's house which contains a television with 3D display capability. The user might not own a 3D capable device, and might never have accessed content through the friend's television. In various embodiments, the user can cause the 3D television to submit a request for content that is associated with that user, such as by the user entering or otherwise providing identifying or authenticating information. A content provider receiving the information can identify and/or authenticate the user, and can enable that user to access any content on the television where the user licenses or rights permit. Further, the user can access the content in a 3D format, which might otherwise not have been previously associated with that user.

Such approaches enable a user to access specific content in a format optimized for any device through which the user can obtain such content. For example, a user can validate an account or identify to an audio or video system on an airplane, and can obtain access to the user's content through that system. Further, the content can be delivered in a format or version appropriate for the airplane. For example, certain airline carriers place restrictions on the type of content that can be displayed on a video system in a plane. When the user accesses content through the system, the user can automatically obtain not only a format that is appropriate for the video system (e.g., a relatively low resolution version for a small LCD screen) but can also automatically receive a version of the content that is edited or otherwise modified for display on the airline video system. Similarly, if the user sits at a table in a diner that has an individual tabletop electronic jukebox, the user can authenticate himself to the system through the jukebox and access the user's music through the jukebox. The music can be delivered in an appropriate format, and since the diner might place restrictions on explicit language played in the establishment the content played might be any clean version of that content.

Figure 9:
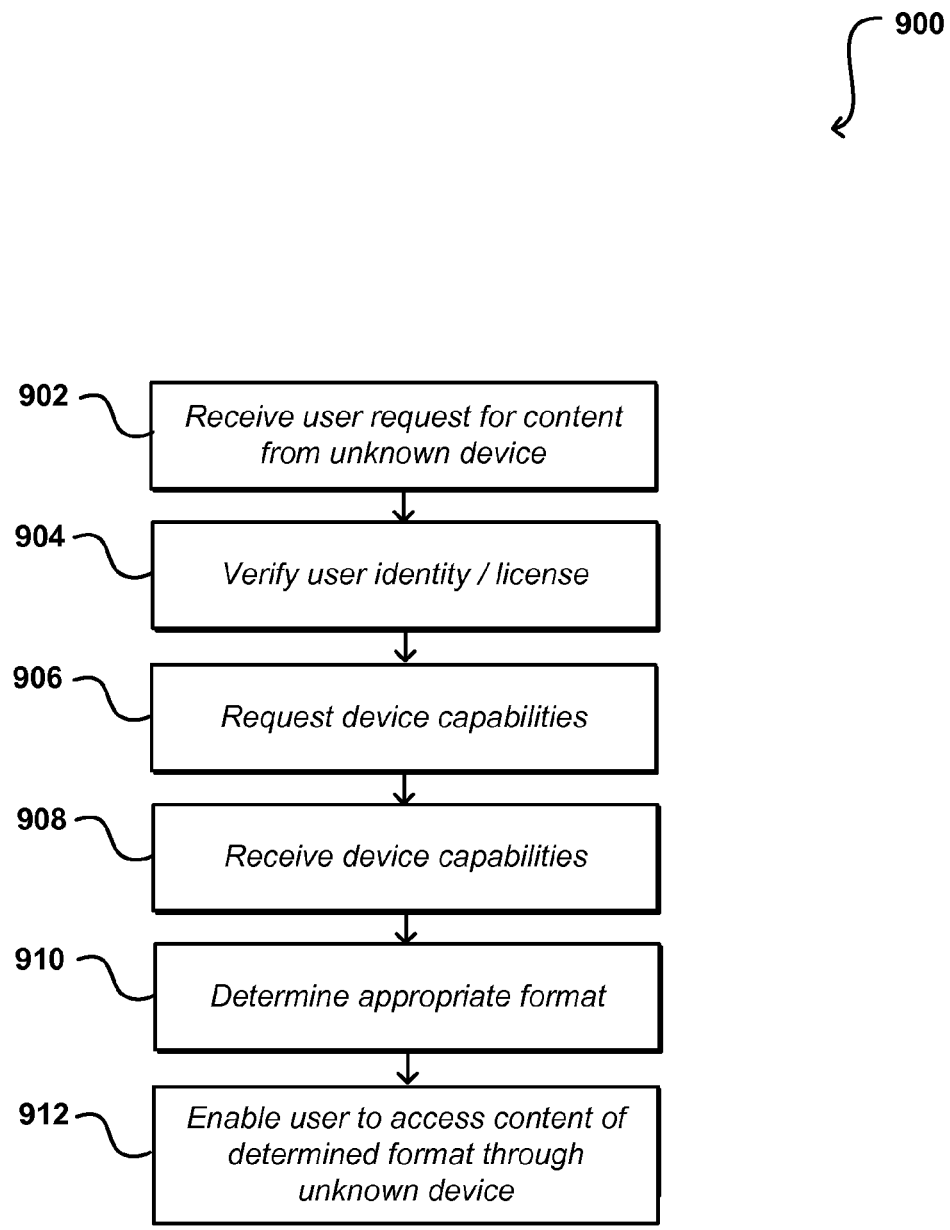
FIG. 9 illustrates an example process for accessing content in an appropriate format from a device previously not associated with a user that can be used in accordance with various embodiments.

FIG. 9 illustrates an example of a process 900 for enabling a user to access content in a format appropriate for a previously unknown or unassociated device that can be used in accordance with various embodiments. In this example, a request is received from a user to access content through an unknown device 902. For example, the request can be received from a device being accessed by the user, where that device has not previously been used by that user to access content, and that device is not otherwise associated with the user or a user account. If the request is received to a content provider, the provider can verify the user identity and licensing rights 904 and, at the same time or after determining whether the user has rights to access content through that device, can request the capabilities of the device 906, if not included in the original request. Upon receiving the device capabilities, an appropriate format can be determined 910 and the user can be enabled to access the content through the device in the determined format 912. In some situations, such as the individual table-top electronic jukebox, multiple users can authenticate themselves to the system during a common session and can access content for each of those users in a jukebox-appropriate format. The users can set a random playlist, for example, which can play music from each of the users' catalogs, etc.

In order to enable users to access content from any device, a content provider might want an increased level of security to prevent unauthorized license sharing or other such content theft. In some embodiments, a user accessing unknown devices must provide more than just a standard username and password or other easily sharable element. For example, a user in some embodiments must present a USB key, wireless fob, Bluetooth device, or other device with a type of private key encryption that can ensure that there is a single instance of a user accessing the content. Additional keys can be obtained for a user for additional license costs as should be apparent. Thus, if a user wants to play content on a friend's device, the user might first be authenticated using the private secure key, such that the content provider can be satisfied that it is not instead the friend improperly accessing the content. Such a device can also provide some simplicity, as a user wishing to access content on an airplane video system can simply plug the key into the system and almost instantly have access to that user's content in formats appropriate for that system without having to go through a complex validation or setup process.

Figure 10:
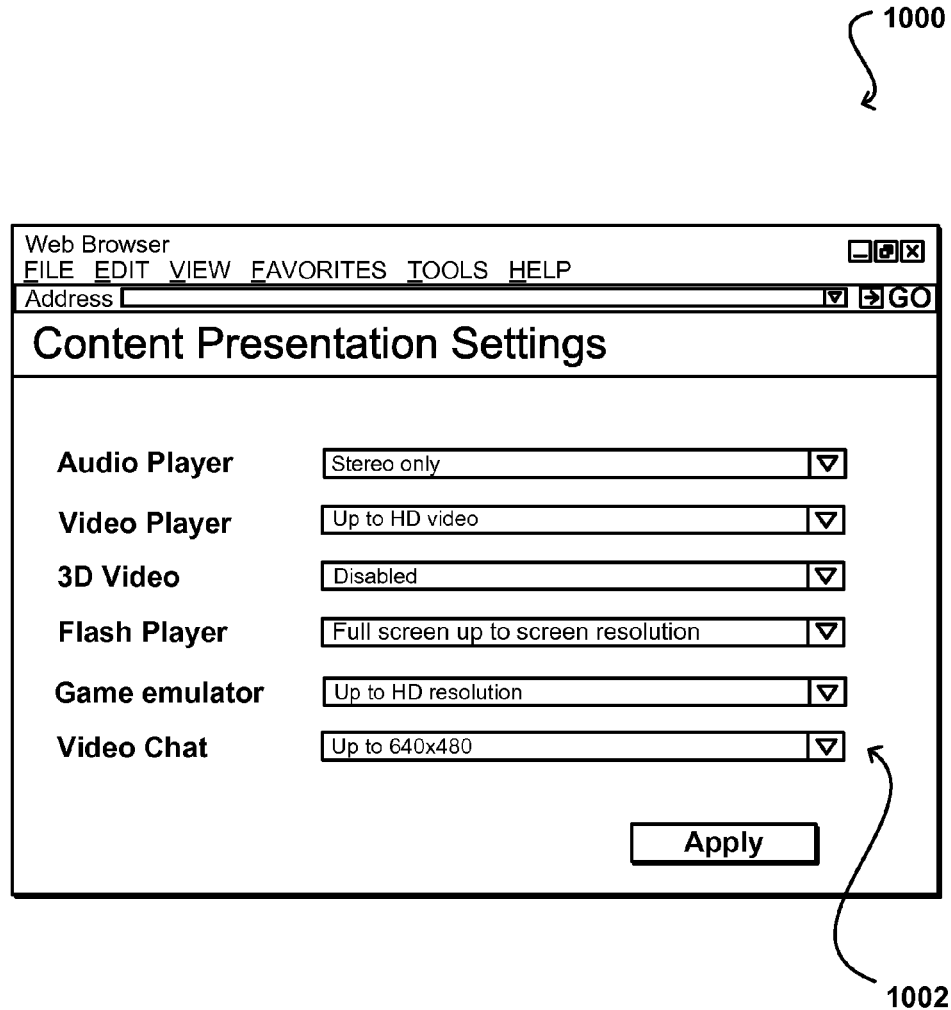
FIG. 10 illustrates an example configuration interface that can be used in accordance with various embodiments.

Many aspects of the content delivery and/or access can be configurable by a user or other party as discussed above. As an example, FIG. 10 illustrates a sample interface 1000 that could be used to enable a user to configure various options in accordance with one embodiment. In this example, the user has several configurable options 1002. Although these options are shown as being selectable through drop-down boxes, it should be understood that any appropriate elements such as radio buttons, text boxes, check boxes, or other such elements known or subsequently developed for such purposes can be used as well. In such an interface, a user can specify formats to be received, formats not to be played, preferred formats, and other such options. In this example, the user specified to only receive stereo audio with video quality up to HD. The user has selected not to receive 3D video, even if available. The user also has specified maximum resolutions for other video options. A user might specify maximum quality settings for less than a possible quality for a device for any number of reasons, such as to conserve bandwidth, memory, or other such resources.

A user can also have the option of placing certain restrictions on content formats for certain devices. For example, a user may only allow clean versions of movies, audio, or other content in car systems, video game consoles, or other devices likely to be accessed by children. A user might allow unedited versions to be played in a theater room or on a personal book reader, or might require a specific password or other requirement before those formats can be "unlocked" or "available" for those device. Similarly, while a user might be able to transport a playlist to a public device or friend's device, the user might restrict certain types of content from being accessed on devices other than a private device. For example, if a user likes cheesy horror movies but is embarrassed to let others know, the user might restrict certain titles, genres, or other groupings of content from being accessible on other devices through the user's account or licenses. Various other access or security controls can be applied as well within the scope of the various embodiments.

In at least some embodiments, the conservation or capability of such resources also can be considered when determining an appropriate format for a device. For example, going back to the example of FIG. 7, it might be the case that the car radio 702 is also capable of playing surround sound or some other relatively high resolution audio format. When determining the appropriate format for the car radio, the content provider system might take into account the fact that the radio connects via a 3G connection. Due to the bandwidth limitations of the 3G connection, a high resolution format might not play satisfactorily on the car radio, as there might be gaps in the playback due to buffering or other such functions due to the inability to receive data fast enough. In such a situation, the system might determine that a standard stereo format is instead preferable as, even though the sound quality might not be optimal, the overall experience will be better due to the content being able to be accessed without interruption. In some cases, a user or device can configure or limit possible formats due to delivery or connection limitations, or other such factors. In some cases, a content delivery system might also be able to communicate with a cellular provider or other such entity to determine the monthly usage for a user, and if that user is getting near the amount of bandwidth allowed for the month, for example, the content provider can lower the quality of the content delivery or otherwise modify the format selections as appropriate for certain devices that use that delivery channel. Thus, a device with higher capabilities might receive a lower quality format than a device with lower capabilities based on aspects such as the connection for the device. Further, delivery channels such as downloading versus streaming can also be determined based upon various capabilities, the connection, etc.

In some embodiments, the system can track user behavior and usage over time to attempt to improve the overall quality of content delivery. For example, in a situation where the user has limited monthly bandwidth, the user might end up getting lower quality formats towards the end of each month. By monitoring the usage patterns over time, the system can attempt to adjust the format selections to avoid limitations near the end of each month. For example, the user might access a piece of content during the middle of the month on a device that is capable of receiving a very high resolution format, but due to the size or resolution of the screen there will be little difference between that format and a lower quality format. In order to conserve bandwidth for later usage, the provider might decide to deliver the content in the lower quality format. Such options can be disallowed by the user, while in some cases the user can specify to delivery lower quality formats where the resulting experience will not be significantly affected. Various other options can be used as well. Further, the user can have the option to override a format selection and request that an upgraded format be accessed.

In some embodiments, a content provider system or other party can obtain and/or track performance information for a device for use in format determinations. For example, a user might access high definition content on a computer that reports that the computer supports high definition video. Due to limitations of the computer such as the amount of available memory, processor speed, number of other applications executing, and other such factors, the playback of high definition video on the computer might be very slow or choppy, or might even cause the computer to hang. Similar problems can occur with other devices as well, which report certain capabilities but are not actually able to delivery those capabilities with an acceptable level of quality. Thus, the system can select formats based at least in part upon actual device performance. Such an approach can be particularly beneficial for devices that are previously unknown or not accessed by a user, as the user may have no idea of the actual performance capabilities of the device. Further, the system can track when the user selects a higher or lower quality format on a certain device as an indicator of the actual capabilities of the device.

In some embodiments, a device can obtain (or at least have access to) a list of all content to which a user has rights when the user is authenticated to the device, including various format and version information. Such a list can be updated and maintained as appropriate, such as when new formats become available to which the user has rights. While the updating and storage of such a list can require certain resources, such a list can minimize the number of request received to a content provider to determine the rights a user has with respect to a certain piece of content.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of allowing access to content on an unknown device in a format appropriate for that device, comprising:
   under control of one or more computer systems configured with executable instructions,
   receiving a request from a user to access identified content on an electronic device, the electronic device not previously being associated with the user;
   requesting secure user identification information from the user, the secure user identification information including a secure private key entered into the electronic device by the user;
   in response to receiving the secure user identification information, validating the secure user identification information and determining rights for the user with respect to the identified content;

requesting capability information for the electronic device, from the electronic device;

determining an amount of bandwidth available for a usage plan associated with the user;

in response to receiving capability information for the electronic device, determining at least one format of at least a portion of the identified content to be accessible via the electronic device based on the capability information, the rights for the user with respect to the identified content, the amount of bandwidth available for the usage plan, and an amount of currently used bandwidth; and allowing the user to access the identified content in the determined at least one format on the electronic device.

2. The computer-implemented method of claim 1, further comprising automatically upgrading capabilities of the electronic device based on the content and the received capability information.

3. The computer-implemented method of claim 1, further comprising determining an optimized combination of formats individually associated with multiple portions of the content based on the received capability information.

4. The computer-implemented method of claim 1, further comprising dynamically providing decision points where the user is presented a choice of formats for a portion or an element of the content based on the received capability information of the electronic device and rights of the user.

5. The computer-implemented method of claim 1, further comprising:

monitoring a usage patterns of the user, the usage pattern indicating a format selection history of the user with respect to previously requested content; and determining a preferred format based on the monitored usage pattern of the user, wherein determining the at least one format of the at least the portion of the content to be accessible by the user via the electronic device is based on the preferred format.

6. The computer-implemented method of claim 1, wherein determining rights for the user with respect to the identified content includes determining a license associated with the user, wherein the license indicates rights of the user to new formats that were unavailable when the license was obtained by the user.

7. The computer-implemented method of claim 1, wherein determining rights for the user with respect to the identified content includes determining a license associated with the user, wherein the license indicates rights of the user to a plurality of formats.

8. The computer-implemented method of claim 1, wherein determining rights for the user with respect to the identified content includes determining a license associated with the user, wherein the license indicates rights of the user to access the identified content on a plurality of devices.

9. The computer-implemented method of claim 1, wherein determining rights for the user with respect to the identified content includes determining a license associated with the user, the license indicating rights of the user to access the identified content based on specification of a single device, wherein the specification of the single device is modifiable.

10. A computer-implemented method of allowing access to content on an electronic device, comprising:

under control of one or more computer systems configured with executable instructions, receiving a request from a user to access content on an electronic device;

authenticating an identity of the user by requesting secure user identification information from the user, the secure user identification information including a secure private key entered into the electronic device by the user;

in response to receiving the secure user identification information, validating the secure user identification information and determining rights for the user with respect to the identified content;

determining one or more capabilities of the electronic device at least in part by receiving capability information from the electronic device;

determining an amount of bandwidth available for a usage plan associated with the user;

based on the identity of the user, the one or more determined capabilities of the electronic device, the amount of bandwidth available, and a currently used bandwidth amount, determining at least one format of at least a portion of the content to be accessible by the user via the electronic device; and allowing the user to access the content in the determined at least one format via the electronic device, wherein the electronic device was not previously associated with the identity of the user.

11. The computer-implemented method of claim 10, wherein the electronic device is a publicly accessible device.

12. The computer-implemented method of claim 10, further comprising:

determining rights of the user with respect to the content, the determining of the at least one format of at least a portion of the content to be accessible on the electronic device being further based on the determined rights.

13. The computer-implemented method of claim 10, wherein allowing access of the content includes at least one of allowing the content to be played, displayed, rendered, downloaded, streamed, or presented on the electronic device.

14. The computer-implemented method of claim 10, wherein the content is available in a plurality of formats, the plurality of formats include at least one of formats with different resolution, audio quality, display requirements, audio channels, delivery channel, and execution language.

15. The computer-implemented method of claim 10, wherein the one or more received capabilities of the electronic device include at least one of rate of power consumption, available battery life, available input mechanisms, available output mechanisms, data connection type, and peripheral information.

16. The computer-implemented method of claim 10, further comprising:

allowing a user to select a different format of at least a portion of the content to be accessible via the electronic device.

17. The computer-implemented method of claim 16, further comprising:

storing the selection of a different format as user override information for the electronic device; and determining a format for at least one of the user, the content, or the electronic device based on the user override information.

18. The computer-implemented method of claim 10, wherein the content is available in multiple versions having different formats, and further comprising:

determining a version of the content to be accessible by the user via the electronic device based on the rights of the user or a type of the electronic device.

19. The computer-implemented method of claim 10, further comprising:
    allowing the user to specify one or more formats to be accessible or non-accessible for at least a type of content via the electronic device.

20. The computer-implemented method of claim 10, further comprising:
    allowing the user to rank one or more formats to be accessible for at least a type of content via the electronic device.

21. A system for allowing access to content on an electronic device, comprising:
    a processor; and
    memory including instructions that, when executed by the processor, cause the system to, at least:
        receive a request from a user to access content on an electronic device;
        authenticate an identity of the user by requesting secure user identification information from the user, the secure user identification information including a secure private key entered into the electronic device by the user;
        in response to receiving the secure user identification information, validate the secure user identification information and determining rights for the user with respect to the identified content;
        determine one or more capabilities of the electronic device at least in part by receiving capability information from the electronic device;
        determine an amount of bandwidth available for a usage plan associated with the user;
        based on the identity of the user, the determined one or more capabilities of the electronic device, the amount of bandwidth available, and a currently used bandwidth amount, determine at least one format of at least a portion of the content to be accessible by the user via the electronic device; and
        allow the user to access the content in the determined at least one format via the electronic device, wherein the electronic device was not previously associated with the identity of the user.

22. The system of claim 21, wherein the instructions when executed further cause the system to:
    determine rights of the user with respect to the content, the determining of the format of the content to be accessible on the electronic device being further based on the determined rights.

23. A non-transitory computer-readable storage medium including instructions that, when executed by a processor, cause a computer system to, at least:
    receive a request from a user to access content on an electronic device;
    authenticate an identity of the user by requesting secure user identification information from the user, the secure user identification information including a secure private key entered into the electronic device by the user;
    in response to receiving the secure user identification information, validate the secure user identification information and determining rights for the user with respect to the identified content;
    determine one or more capabilities of the electronic device at least in part by receiving capability information from the electronic device;
    determine an amount of bandwidth available for a usage plan associated with the user;
    based on the identity of the user, the determined one or more capabilities of the electronic device, the amount of bandwidth available, and a currently used bandwidth amount, determine at least one format of at least a portion of the content to be accessible by the user via the electronic device; and
    allow the user to access the content in the determined format via the electronic device,
    wherein the electronic device was not previously associated with the identity of the user.

24. The non-transitory computer-readable storage medium of claim 23, wherein the instructions when executed further cause the system to:
    determine rights of the user with respect to the content, the determining of the format of the content to be accessible on the electronic device being further based on the determined rights.

* * * * *